United States Patent
Malik et al.

(10) Patent No.: US 7,826,428 B2
(45) Date of Patent: Nov. 2, 2010

(54) ASSOCIATING A WIRELESS COMPUTING DEVICE WITH A DIFFERENT ACCESS POINT

(75) Inventors: Ajay Malik, Santa Clara, CA (US); Puneet Batta, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 397 days.

(21) Appl. No.: 11/950,531

(22) Filed: Dec. 5, 2007

(65) Prior Publication Data

US 2009/0147697 A1    Jun. 11, 2009

(51) Int. Cl.
*H04W 4/00* (2009.01)
*H04W 36/00* (2009.01)

(52) U.S. Cl. .................. 370/331; 455/438; 455/440

(58) Field of Classification Search .......... 370/230, 370/235, 252, 328, 329, 331, 332, 333; 455/422.1, 455/436, 437, 438, 440, 445
See application file for complete search history.

(56) References Cited

U.S. PATENT DOCUMENTS

| | | | |
|---|---|---|---|
| 6,438,377 B1 * | 8/2002 | Savolainen | 455/439 |
| 6,785,254 B2 * | 8/2004 | Korus et al. | 370/338 |
| 7,295,842 B2 * | 11/2007 | Yang et al. | 455/436 |
| 7,496,364 B2 * | 2/2009 | Hoghooghi et al. | 455/436 |
| 2009/0042572 A1 * | 2/2009 | Craig et al. | 455/436 |

* cited by examiner

*Primary Examiner*—Aung S Moe
*Assistant Examiner*—Kerri M Rose

(57) ABSTRACT

In a network comprising a wireless computing device and a wireless switch coupled to a plurality of access points, techniques are provided for determining a particular one of access points that the wireless computing device is to be associated with and associating the wireless computing device therewith. According to one implementation, the wireless switch monitors one or more wireless communication performance metrics, and determines based on the wireless communication performance metrics, whether the wireless computing device is currently associated with the one of the access points that wireless computing device is to be associated with. If not, then the wireless switch transmits an instruction to the wireless computing device to associate with a particular access point that wireless computing device is to be associated with.

9 Claims, 9 Drawing Sheets

ASSOCIATING A WIRELESS COMPUTING DEVICE WITH A DIFFERENT ACCESS POINT

FIELD OF THE INVENTION

The present invention generally relates to network communications, and more particularly relates to techniques for associating a computing device with an access point.

BACKGROUND OF THE INVENTION

Wireless computer networks have been defined in which a wireless computing device communicates with a network via an access point. In many cases, when the wireless computing device moves about the wireless network, the wireless computing device could benefit from associating with and communicating through a different access point even though the wireless computing device is still within communication range of the access point it is currently associated with.

Accordingly, it is desirable to provide improved techniques for associating a wireless computing device with a new access point as the computing device moves from one physical location to another. Furthermore, other desirable features and characteristics of the present invention will become apparent from the subsequent detailed description of the invention and the appended claims, taken in conjunction with the accompanying drawings and this background of the invention.

BRIEF SUMMARY

In a network comprising a wireless computing device and a wireless switch coupled to a plurality of access points, techniques are provided for determining a particular one of access points that the wireless computing device is to be associated with and associating the wireless computing device therewith. According to one implementation, the wireless switch monitors one or more wireless communication performance metrics, and determines based on the wireless communication performance metrics, whether the wireless computing device is currently associated with the one of the access points that wireless computing device is to be associated with. If not, then the wireless switch transmits an instruction to the wireless computing device to associate with a particular access point that wireless computing device is to be associated with.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Exemplary Network

Figure 1:
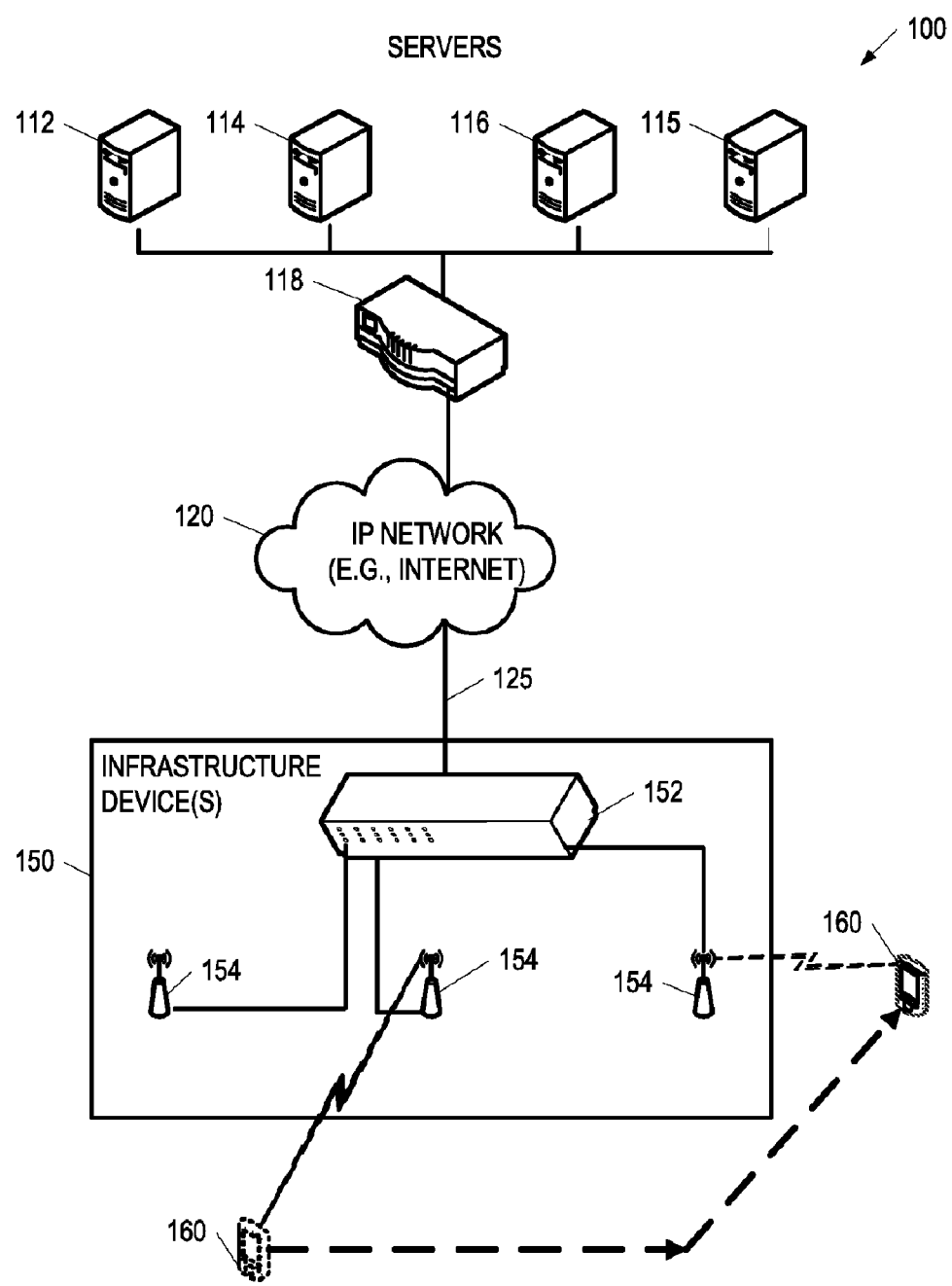
FIG. 1 illustrates an exemplary network.

FIG. 1 illustrates an exemplary network 100 which includes Network Application Servers (NASs) 112, 114, 115, 116, a router 118, an IP network 120, infrastructure devices 150 including a wireless switch 152 and access points 154, and a wireless computing device 160. A link 125 couples the router 118 to the wireless switch 152 over a network 120 which may comprise, for example, the Internet or an intranet. Although FIG. 1 illustrates a single link 125, in other practical implementations, there may be multiple logical links which couple the wireless switch 152 to the router 118.

As used herein, the term "wireless computing device" refers to any computer designed to communicate with an infrastructure device over an air interface through a wireless channel. In many cases such wireless computing devices are "handheld" and potentially mobile or "nomadic." A wireless communication device may be any one of a number of types of mobile computing devices including, but not limited to, a hand-held or laptop devices and personal computers, tablet Personal Computers (PCs), a PC card, compact flash, personal digital assistants (PDAs), mobile telephone handsets, and the like. It will be appreciated by those skilled in the art that although FIG. 1 shows an exemplary network configuration in which one wireless computing device 160 is present, in many cases tens, hundreds or thousands of wireless computing devices can be configured as part of the network at any given time. The wireless computing device 160 can communicate with the infrastructure devices 150 in accordance with any known communication standards such as those based on IEEE 802.11 (e.g., 802.11a, 802.11b, 802.11g, 802.11e, 802.11n or 802.11s) or 802.16 standards, Bluetooth, or any other packetized communication standard or packet data protocols such as TDMA (time division multiple access). As used herein, "IEEE 802.11" refers to a set of IEEE Wireless LAN (WLAN) standards that govern wireless networking transmission methods. IEEE 802.11 standards have been and are currently being developed by working group 11 of the IEEE LAN/MAN Standards Committee (IEEE 802). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA.

In the embodiment illustrated in FIG. 1, the infrastructure devices 150 include a wireless switch 152 coupled to access points 154. As used herein, the term "wireless switch (WS)" refers to a device that channels incoming data from any of multiple input ports to the specific output port that will take the data toward its intended destination. A switch typically performs the data-link or layer 2 functions and determines, from the MAC address in each packet, which output port to use for the next part of its trip to the intended destination. In some embodiments, the switch can function as an IP switch which may also perform network or layer 3 routing functions. In one embodiment, the access point may be wireless access point that complies with the IEEE 802.11 Standard or other wireless local area network (WLAN) Standards, a Bluetooth access point, or the like. In addition, as used herein, the term "access point (AP)" refers to a device connected to a local area network (LAN) that enables remote wireless stations to communicate with the LAN. An AP is a network-capable device containing a transceiver and antenna for transmitting signals to and receiving signals from the remote stations. An AP serves as the point of interconnection between the WLAN and a fixed wire network and allows wireless communication devices to be quickly and easily connected to a wired LAN. Each AP can serve multiple users within a defined network area.

The router 118 communicates with the wireless switch 152 over the open network 120. The router 118 allows for transmitting and/or receiving of packetized audio, video and/or data information as data packets. In one implementation, the router 118 can be an IP router, where each interface on the IP router is associated with an independent IP subnet.

In this exemplary embodiment, a number of Network Application Servers (NASs) 112, 114, 115, 116 are illustrated as being coupled to the router 118. In the exemplary embodiment illustrated in FIG. 1, the NASs comprise a File Transfer Protocol (FTP) server 112, a file server 114, a HTTP server 115 and a DHCP server 116; however, in other embodiments other known types of application servers are typically present such as an e-mail server, a Direct Connection Protocol (DCP) server, an enterprise resource planning server, an application server, a proxy server, a telnet server, a news server, an audio-video streaming server, etc.

Figure 2A:
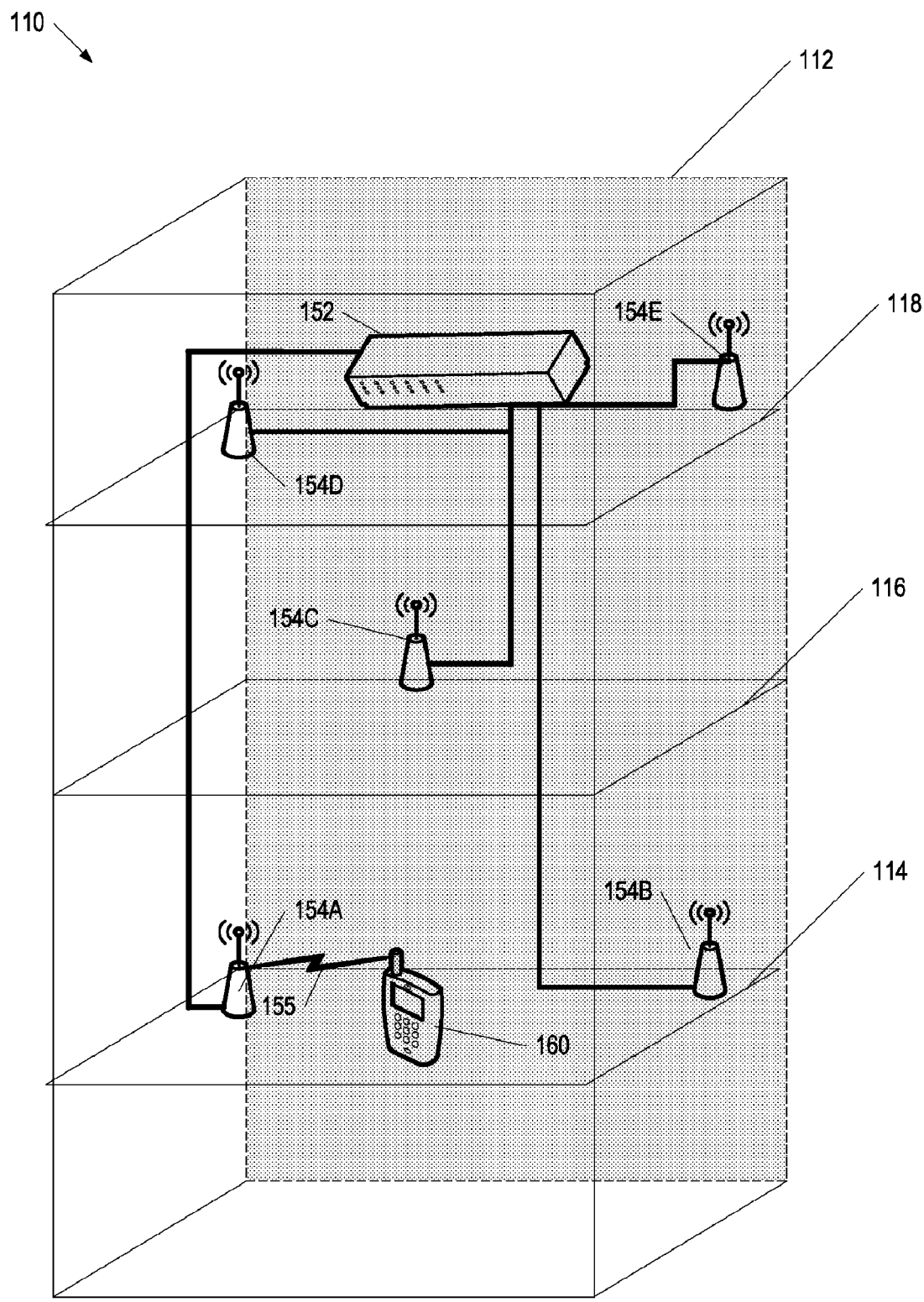
FIGS. 2A and 2B illustrate an exemplary network deployed within a structure as a computing device moves from one physical location to a new physical location within the structure.
Figure 2B:
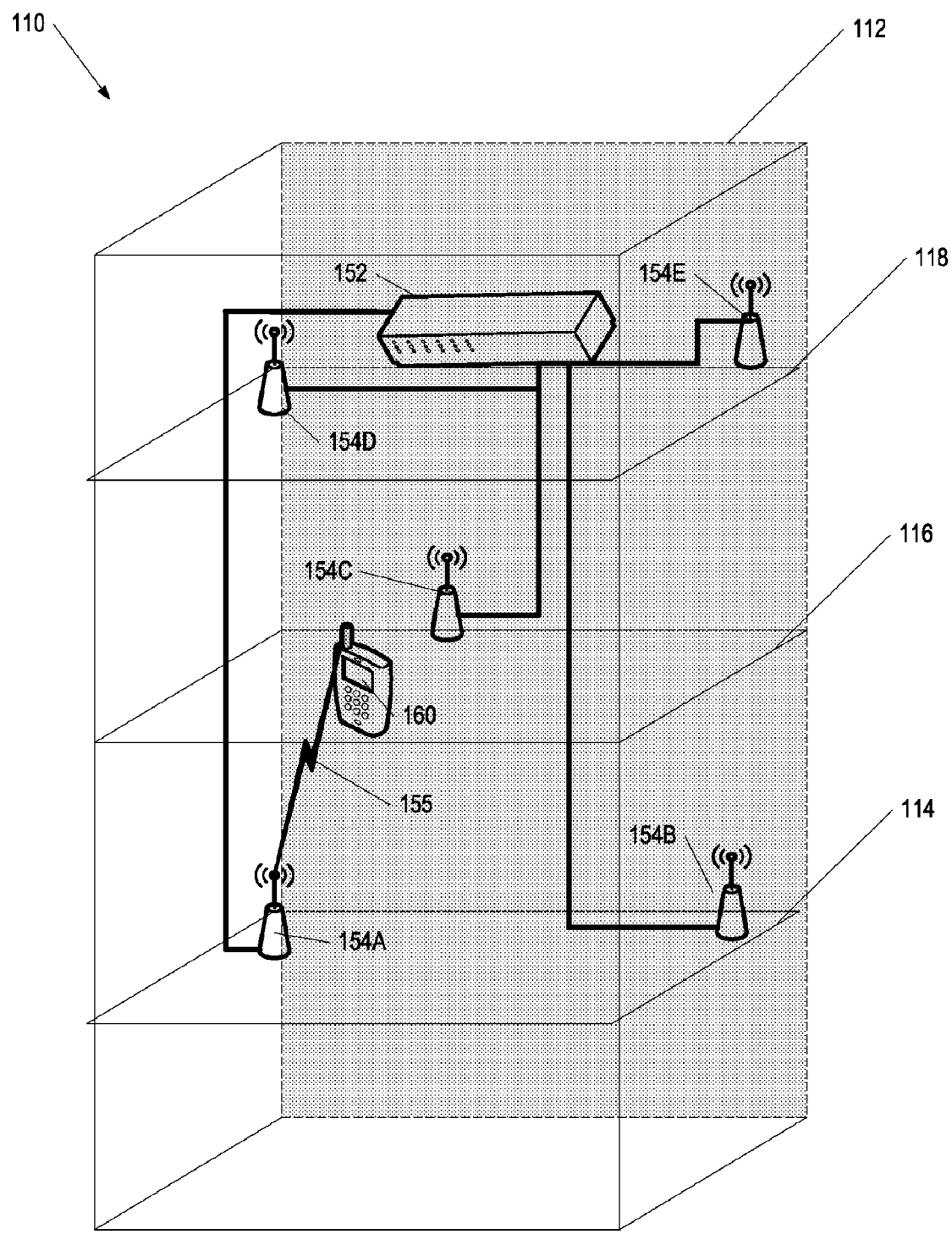

FIGS. 2A-2B illustrate an exemplary network 110 deployed within a structure 112 as a computing device 160 moves from one physical location to a new physical location within the structure 112. In this exemplary network, the structure 112 comprises a number of rooms or "floors" 114-118. The network 110 comprises infrastructure devices 150, including a wireless switch 152 coupled to access points 154 A-E, and a wireless computing device 160. For simplicity of illustration, other network entities connected to the wireless switch 152 are not illustrated in FIGS. 2A-2B.

As illustrated in FIG. 2A, the wireless computing device 160 is associated and communicating with access point 154A located on a first floor 114 via wireless link 155, and the wireless computing device 160 then physically moves to another floor 116 of the structure 112 as illustrated in FIG. 2B. Although it is likely that the wireless computing device 160 would be better suited to associate with and communicate through access point 154C (e.g., have a better data rate when connected through access point 154C), because the wireless computing device 160 is still within communication range of access point 154A, without some reason to re-associate, the wireless computing device 160 still continues its association with access point 154A and continues to communicate with access point 154A via wireless link 155. The user of the wireless computing device 160 may experience additional latencies, more retries or more multipath/interference because of its location.

Overview

Techniques are provided in which wireless switch 152 actively monitors: (1) the current location of the wireless computing device 160 with respect to various APs in the network (e.g., the relative proximity of the wireless computing device 160 with respect to APs 154 in the network 110), and (2) wireless communication performance metrics provided from APs 154 regarding wireless communication performance associated with communications between AP 154A and wireless computing device 160. Based on the wireless communication performance metrics and the current location of the wireless computing device 160 with respect to various APs 154 in the network 110, the wireless switch 152 determines the "best" AP for wireless computing device 160 to be associated with, and then perform processing with the best AP prior to instructing the wireless computing device 160 to associate with the "best" AP for the wireless computing device 160. This allows the wireless computing device to quickly associate with the best AP when instructed to do so. Non-limiting examples of these techniques will now be described below with reference to FIGS. 3-8.

Figure 3:
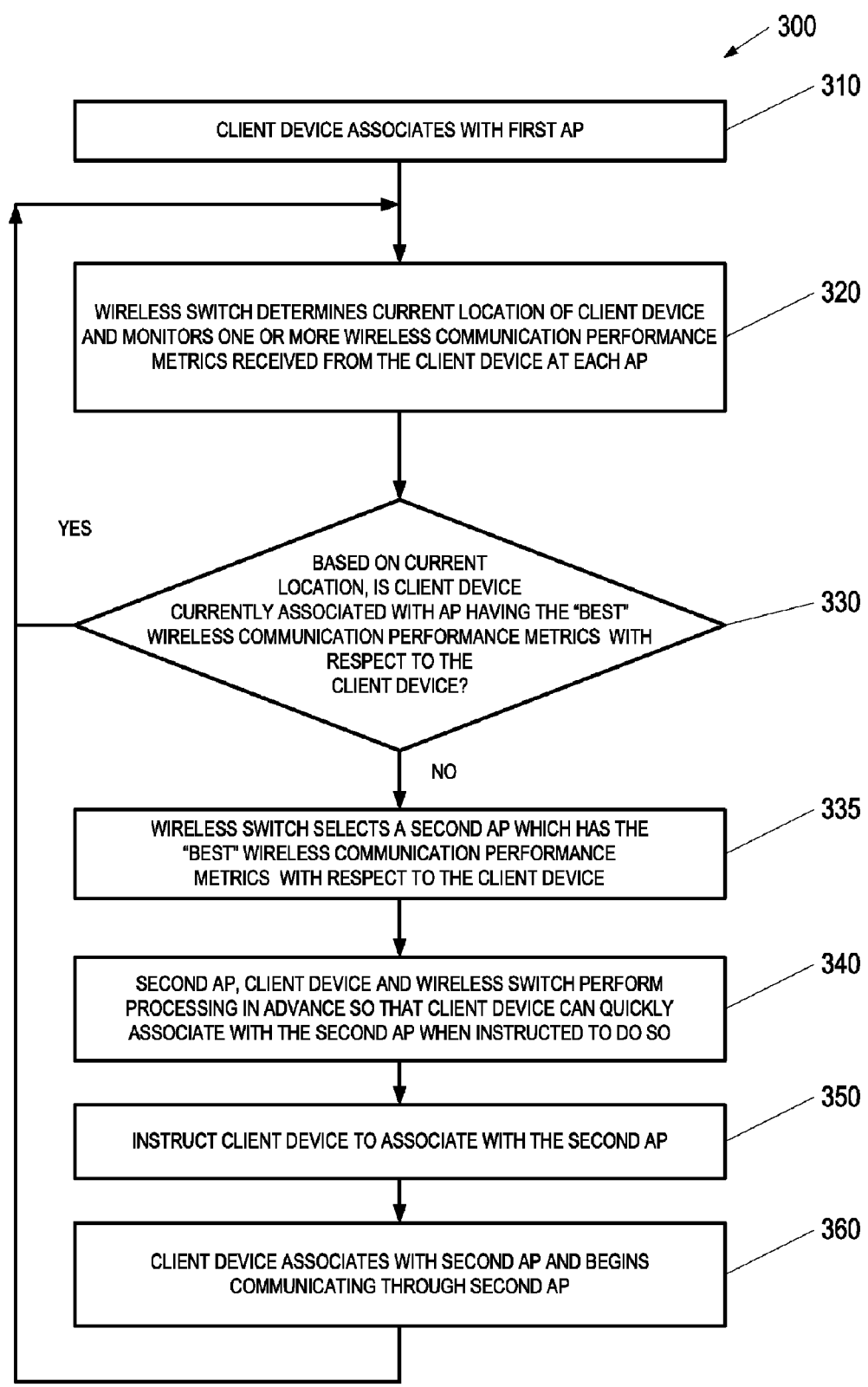
FIG. 3 is a flowchart illustrating a method for associating a computing device with a new access point (AP) in accordance with some embodiments of the present invention.

FIG. 3 is a flowchart illustrating a method 300 for associating a wireless computing device 160 with a new access point (AP) 154C in accordance with some embodiments of the present invention. Method 300 will be described below with reference to the exemplary network 110 illustrated in FIGS. 2A and 2B; however, it will be appreciated that application/implementation of method 300 is not limited to the network architecture illustrated in FIGS. 2A and 2B.

At step 310, the wireless computing device 160 associates with initial AP 154A.

At step 320, the wireless switch 152 determines (either passively or actively) the current location of the wireless computing device 160, and monitors one or more wireless communication performance metrics received from the wireless computing device 160 at each AP 154. In one implementation, the wireless switch 152 can determine the current location of the wireless computing device 160 using triangulation (trilateration) techniques and received signal strength indicators (RSSIs) from different access points (or other reference points) or information regarding time-difference-of-arrival (TDOA). To determine the relative proximity or location of the wireless computing device 160 with respect to each access point 154 that the wireless computing device 160 is within communication range of, the wireless switch 152 makes use of information about location of each access point in the facility. In some implementations, location information for each access point can be either pre-configured/manually configured by an administrator, and the wireless switch 152 can compute the distance of the wireless computing device 160 from each AP (or other reference point), define a polygon around each AP (or other reference point), and then estimate the position of wireless computing device 160 to be in the area that is common intersection of all the polygons across each AP. In some implementations, the triangulation (trilateration) techniques used by the wireless switch 152 to determine the current location of the wireless computing device 160 can make use of theoretical RSSI propagation models in the facility if available. In still other embodiment, the wireless switch 152 can receive the current location of the wireless computing device 160 from an external location calculation algorithm that runs, for example, on an AP or other external device. As described in more detail below, the wireless communication performance metrics can be provided from one or more access points, the wireless computing device 160 itself, sensors installed in the network, or the wireless switch 152.

Method 300 then proceeds to step 330 where the wireless switch 152 determines whether the wireless computing device 160 is currently associated with an access point (i.e., AP initial AP 154A in this example) having the "best" wireless communication performance metrics with respect to the wireless computing device 160.

To determine the "best AP" criteria, at least some of the above parameters can be monitored for a specific period of time (or could be user configured): received signal strength indicators (RSSIs), signal to noise ratios (SNRs), interference in an area, relative traffic loads on APs (to load balance the traffic between APs), relative loads at the wired switches if more than one switch is deployed (to load balance the traffic between the switches). The metrics which can be considered by the wireless switch 152 may also comprise any one of, or any combination of, quality indicator metrics (QIMs) which can provide indicia of channel quality between the wireless computing device 160 and any APs in its vicinity (e.g., communication range). The QIMs can include any known Channel Quality Metrics (CQMs) and/or Channel Capacity Metrics (CCMs). CQMs can include any metrics which reflect channel or link quality between the wireless computing device 160 and any APs in the vicinity (e.g., communication range) of the wireless computing device 160. The CQMs can be made during the reception, demodulation, and/or decoding of a packet. For example, one CQM can be a received signal strength indicator (RSSI) value provided from the access points of other entities in the network. Another CQM can be a received sensitivity (RS) value (e.g., the lowest level signal strength at which a packet can be successfully recovered) such that any packet received with a value less than a threshold RS value will be viewed as noise. CCMs can include any metrics which reflect channel capacity between the wireless computing device 160 and any APs in the vicinity (e.g., communication range) of the wireless computing device 160. The CCMs can include a packet error rate (PER) estimate or a bit-error rate (BER) estimate, the number of multipath signals present during demodulation, a post-detection signal quality (PDSQ) value, and an analog gain control (AGC) output.

Depending on the specific implementation, the QIMs can include, for example:
- a ratio of a period during which a channel is sensed as being busy with respect to an overall measurement period;
- a difference between inbound data rate of a given data flow and outbound data rate of the given data flow;
- a packet queuing delay;
- a forecasted data load based on flow setup control messages exchanged on a common channel;
- a data load computed based on the number of data flows and their respective traffic characteristics (e.g., a wireless switch compares the computed data load with an advertised or known maximum data load);
- a ratio of busy resources in a resource allocation message;
- a transmitted power level (TPL) at which the respective data packets were transmitted by the wireless computing device 160 over the respective links (e.g., the power level at which the wireless computing device 160 finds it necessary to transmit a data-packet over the link);
- an average of a number of retransmissions per packet (e.g., how many packets are transmitted with up to a pre-defined number of retransmissions);
- a percentile of the number of retransmissions per packet (e.g., how many packets are transmitted with up to a pre-defined number of retransmissions);
- packet error rate (PER) or average packet error rate (PER); and
- signal-to-noise ratio (SNR) of the received signal (usually measured in terms of $E_b/N_0$, which stands for energy per bit divided by the one-sided noise density) or an average thereof;
- signal-to-interference-plus-Noise Ratio (SINR) in previous packets successfully received, and
- the product PER×SINR or an average thereof.

If the wireless switch 152 determines that the wireless computing device 160 is currently associated with an access point having the "best" wireless communication performance metrics with respect to the wireless computing device 160, then method 400 loops back to step 320, where the wireless switch 152 re-determines the current location of the wireless computing device 160, and continues to monitor one or more wireless communication new performance metrics received from the wireless computing device 160 at each AP 154.

If the wireless switch 152 determines that the wireless computing device 160 is not currently associated with an access point having the "best" wireless communication performance metrics with respect to the wireless computing device 160, then the method 300 proceeds to step 335, where the wireless switch 152 selects, based on the location and the wireless communication performance metrics, the "best" access point that wireless computing device 160 is to be associated with. In one implementation, the wireless switch 152 selects the particular access point which has particular wireless communication performance metrics associated therewith which indicate improved channel quality along a wireless link between the wireless computing device 160 and the particular access point (which in this example is AP 154C).

At step 340, the wireless switch 152 transmits a "move" message to the wireless computing device 160 and AP 154C (i.e., the AP which has the "best" wireless communication performance metrics with respect to the current location of the wireless computing device 160), and upon receiving the "move" message, the wireless computing device 160 and AP 154C, the wireless computing device 160, AP 154C and the wireless switch 152 perform advanced processing which allows the wireless computing device to perform expedited association with the AP 154C upon receiving the instruction to associate with AP 154C at step 350. By performing processing in advance the wireless computing device 160 can quickly associate or perform expedited association with AP 154C upon being instructed to do so. The advanced processing is processing that would normally be performed after the wireless computing device associates with the particular access point, and can involve, for example, updating data structures, security keys and associations, verifying access control lists (ACLs)/authentication, and other tasks that would be performed once the wireless computing device associates with the particular access point. By performing processing in advance of instructing the wireless computing device 160 to associate with AP 154C, the handover period can be reduced when the wireless computing device 160 associates with new AP 154C. After the processing takes place, the wireless switch 152 instructs the wireless computing device 160 to associate with AP 154C at step 350. At step 360, the wireless computing device 160 associates with AP 154C and begins communicating through AP 154C.

Figure 4:
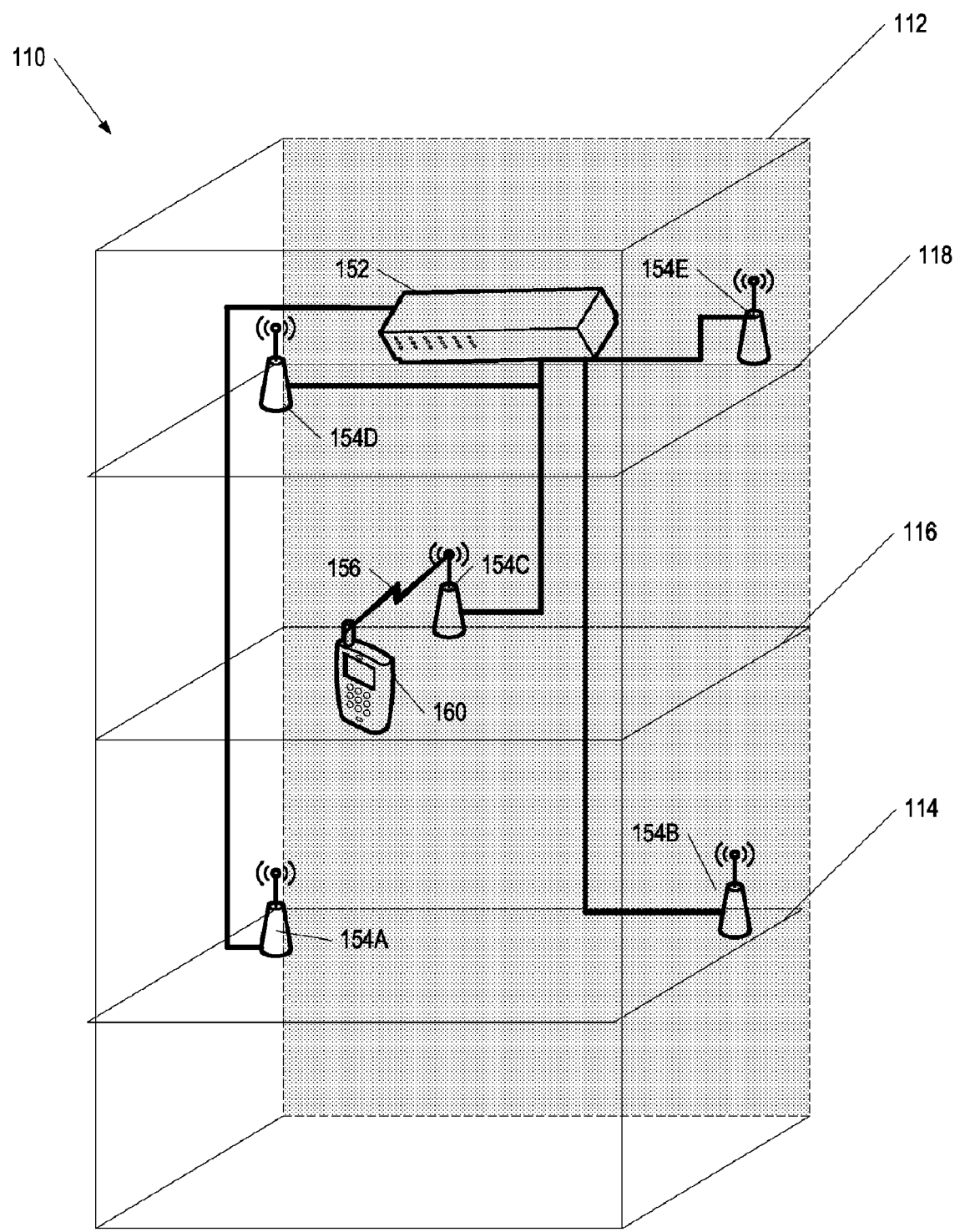
FIG. 4 illustrates the exemplary network of FIGS. 2A and 2B after the computing device applies the method of FIG. 3 in accordance with some embodiments of the present invention.

FIG. 4 illustrates the exemplary network of FIGS. 2A-2B after the computing device 160 applies, for example, the method 300 of FIG. 3, in accordance with some embodiments of the present invention. After being instructed to associate with new access point 154C by the wireless switch 152, the computing device 160 has now associated with and is communicating through access point 154C, as illustrated in FIG. 4.

Other techniques will now be described which can allow a computing device 160 to quickly associate with and communicate through a "better" access point 154C.

Figure 5:
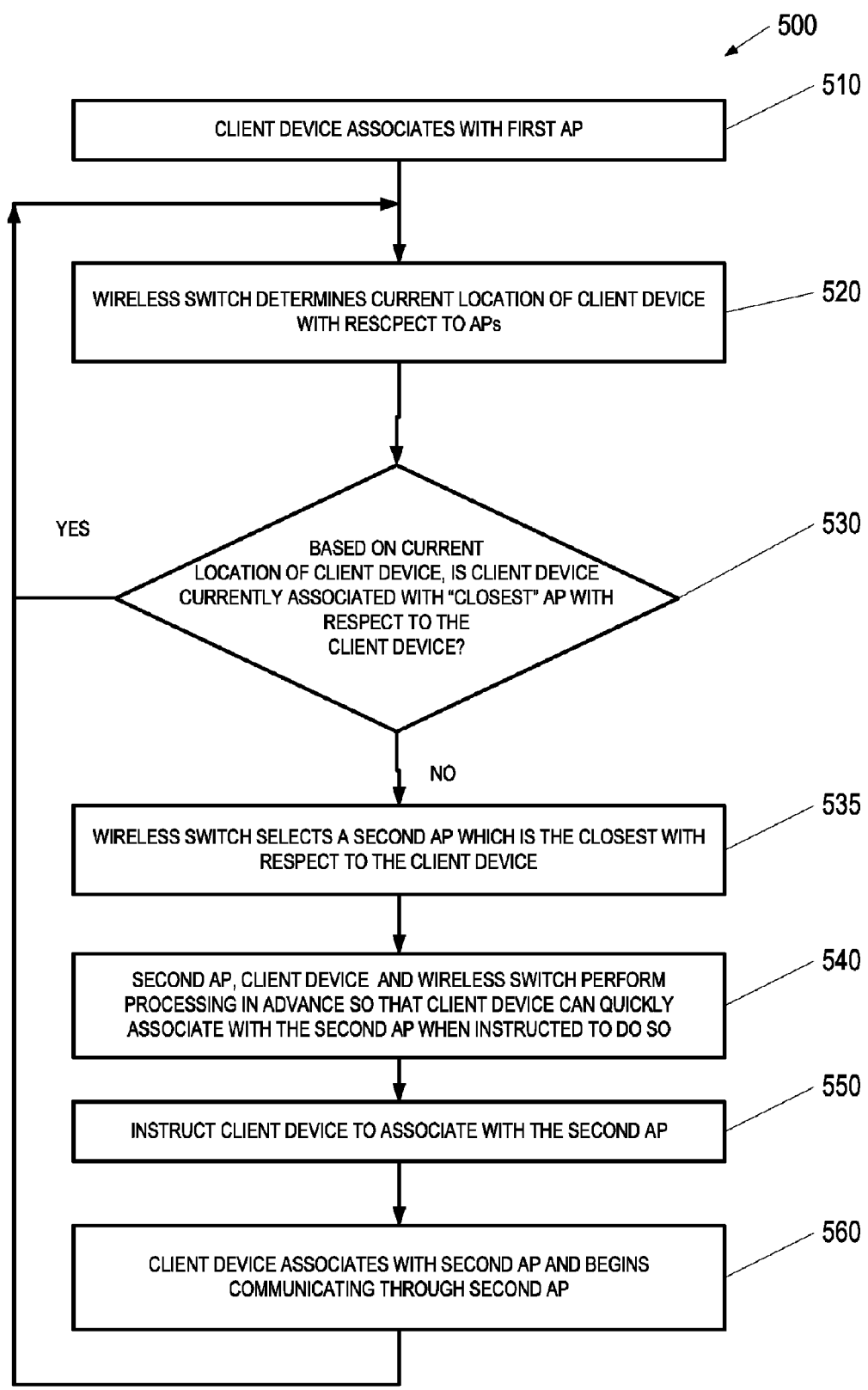
FIG. 5 is a flowchart illustrating a method for associating a computing device with a new access point (AP) in accordance with some embodiments of the present invention.

FIG. 5 is a flowchart illustrating a method 500 for associating a computing device with a new access point (AP) in accordance with some embodiments of the present invention.

Method 500 will be described below with reference to the exemplary network 110 illustrated in FIGS. 2A and 2B; however, it will be appreciated that application/implementation of method 500 is not limited to the network architecture illustrated in FIGS. 2A and 2B.

At step 510, the wireless computing device 160 associates with initial AP 154A. At step 520, the wireless switch 152 determines the current location of the wireless computing device 160, and monitors the relative proximity or location of the wireless computing device 160 with respect to each AP 154 that the wireless computing device 160 is within communication range of.

Method 500 then proceeds to step 530 where the wireless switch 152 determines whether the wireless computing device 160 is currently associated with the closest access point (i.e., AP 154C in this example) with respect to the wireless computing device 160.

If the wireless switch 152 determines that the wireless computing device 160 is currently associated with the closest access point with respect to the wireless computing device 160, then method 500 loops back to step 520, where the wireless switch 152 re-determines the current location of the wireless computing device 160, and continues to monitor the location of the wireless computing device 160 with respect to each AP 154.

If the wireless switch 152 determines that the wireless computing device 160 is not currently associated with the closest access point with respect to the wireless computing device 160, then the method 500 proceeds to step 535, where the wireless switch 152 selects, based on the relative location of the wireless computing device 160 with respect to each of the AP 154, the "best" access point that wireless computing device 160 is to be associated with. In this implementation, the wireless switch 152 selects the particular access point which is the closest distance from the wireless computing device 160 (which in this example is AP 154C).

At step 540, the wireless switch 152, wireless computing device 160 and the closest AP 154C with respect to the current location of the wireless computing device 160 perform processing in advance so that the wireless computing device 160 can quickly associate with AP 154C. By performing processing in advance of instructing the wireless computing device 160 to associate with AP 154C, the handover period can be reduced when the wireless computing device 160 associates with new AP 154C. After the processing takes place, the wireless switch 152 instructs the wireless computing device 160 to associate with AP 154C at step 550. At step 560, the wireless computing device 160 associates with AP 154C and begins communicating through AP 154C.

Figure 6:
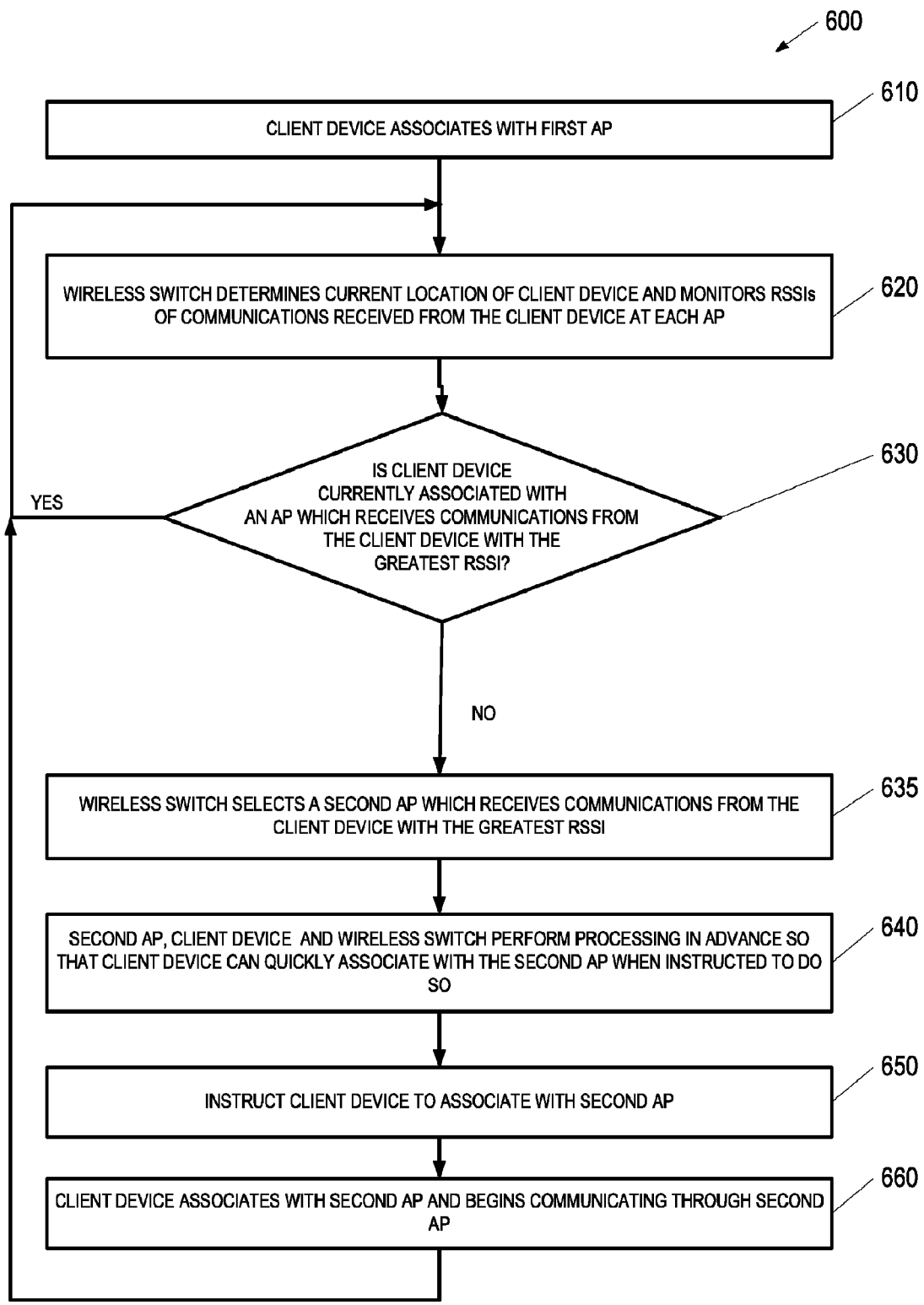
FIG. 6 is a flowchart illustrating a method for associating a computing device with a new access point (AP) in accordance with some embodiments of the present invention.

FIG. 6 is a flowchart illustrating a method 600 for associating a computing device 160 with a new access point (AP) in accordance with some embodiments of the present invention.

At step 610, the wireless computing device 160 associates with initial AP 154A. At step 620, the wireless switch 152 determines the current location of the wireless computing device 160, and monitors RSSIs received from the wireless computing device 160 at each AP 154. Method 600 then proceeds to step 630 where the wireless switch 152 determines whether the wireless computing device 160 is currently associated with an access point having the "best" RSSI with respect to the wireless computing device 160.

If the wireless switch 152 determines that the wireless computing device 160 is currently associated with the access point having the "best" RSSI with respect to the wireless computing device 160, then method 600 loops back to step 620, where the wireless switch 152 re-determines the current location of the wireless computing device 160, and continues to monitor RSSIs received from the wireless computing device 160 at each AP 154.

If the wireless switch 152 determines that the wireless computing device 160 is not currently associated with an access point having the "best" RSSI with respect to the wireless computing device 160, then the method 600 proceeds to step 635, where the wireless switch 152 selects the particular access point which has the "best" RSSI with respect to the wireless computing device 160 (which in this example is AP 154C).

At step 640, the wireless switch 152, wireless computing device 160 and AP 154C (i.e., the AP which has the "best" RSSI with respect to the current location of the wireless computing device 160) perform processing in advance so that the wireless computing device 160 can quickly associate with AP 154C. After this processing takes place, then the wireless switch 152 instructs the wireless computing device 160 to associate with AP 154C at step 650. At step 660, the wireless computing device 160 associates with AP 154C and begins communicating through AP 154C.

Figure 7:
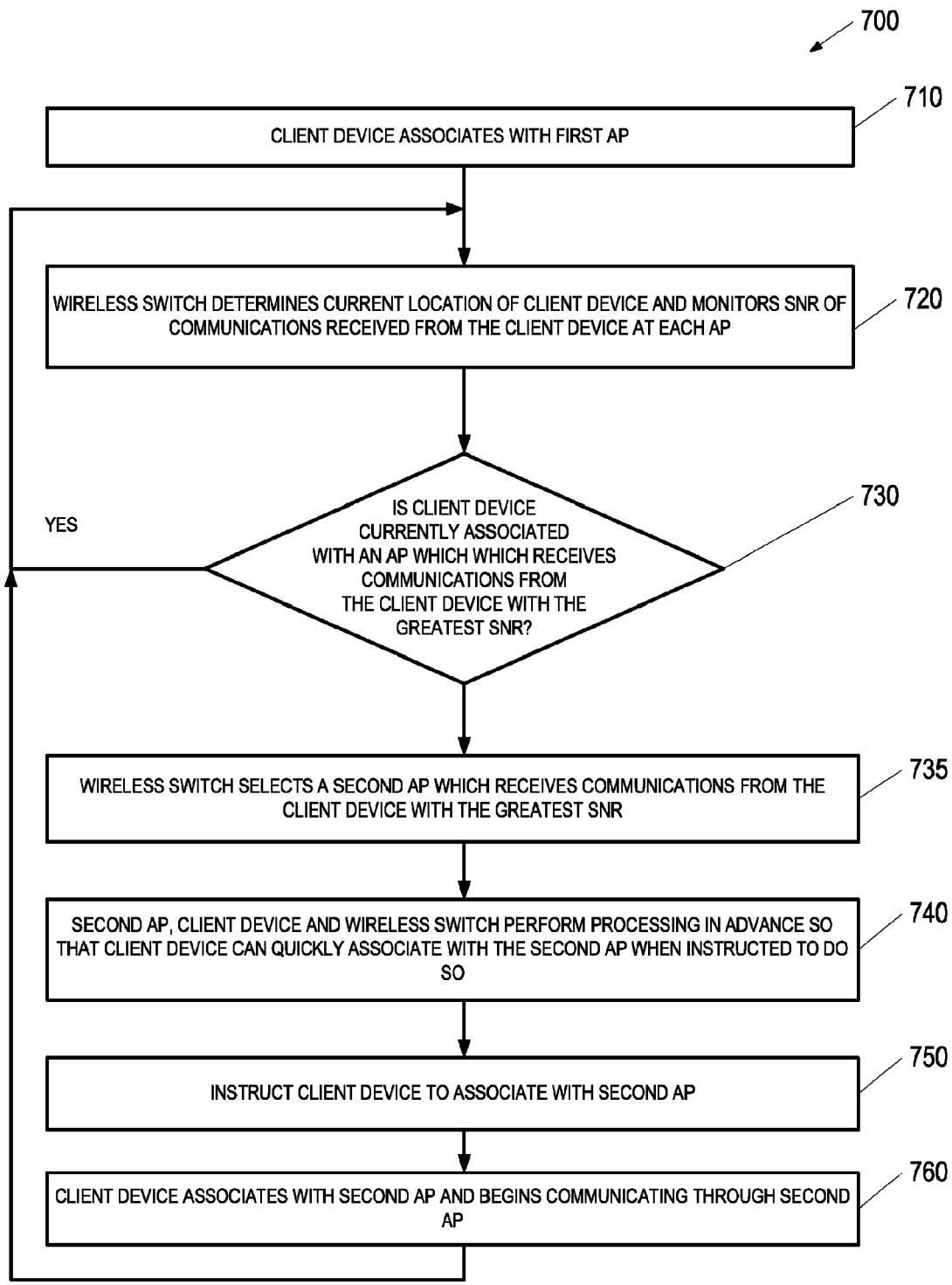
FIG. 7 is a flowchart illustrating a method for associating a computing device with a new access point (AP) in accordance with some embodiments of the present invention.

FIG. 7 is a flowchart illustrating a method 700 for associating a computing device 160 with a new access point (AP) in accordance with some embodiments of the present invention.

At step 710, the wireless computing device 160 associates with initial AP 154A. At step 720, the wireless switch 152 determines the current location of the wireless computing device 160, and monitors signal-to-noise ratios (SNRs) in signals received from the wireless computing device 160 at each AP 154. Method 700 then proceeds to step 730 where the wireless switch 152 determines whether the wireless computing device 160 is currently associated with an access point having the "best" SNR with respect to the wireless computing device 160.

If the wireless switch 152 determines that the wireless computing device 160 is currently associated with the access point having the "best" SNR with respect to the wireless computing device 160, then method 700 loops back to step 720, where the wireless switch 152 re-determines the current location of the wireless computing device 160, and continues to monitor SNRs received from the wireless computing device 160 at each AP 154.

If the wireless switch 152 determines that the wireless computing device 160 is not currently associated with an access point having the "best" SNR with respect to the wireless computing device 160, then the method 700 proceeds to step 735, where the wireless switch 152 selects, based on the wireless communication performance metrics, the access point having the "best" SNR with respect to the wireless computing device 160 (which in this example is AP 154C).

At step 740, the wireless switch 152, wireless computing device 160 and AP 154C (i.e., the AP which has the "best" SNR with respect to the current location of the wireless computing device 160) perform processing in advance so that the wireless computing device 160 can quickly associate with AP 154C. After this processing takes place, then the wireless switch 152 instructs the wireless computing device 160 to associate with AP 154C at step 750. At step 760, the wireless computing device 160 associates with AP 154C and begins communicating through AP 154C.

Figure 8:
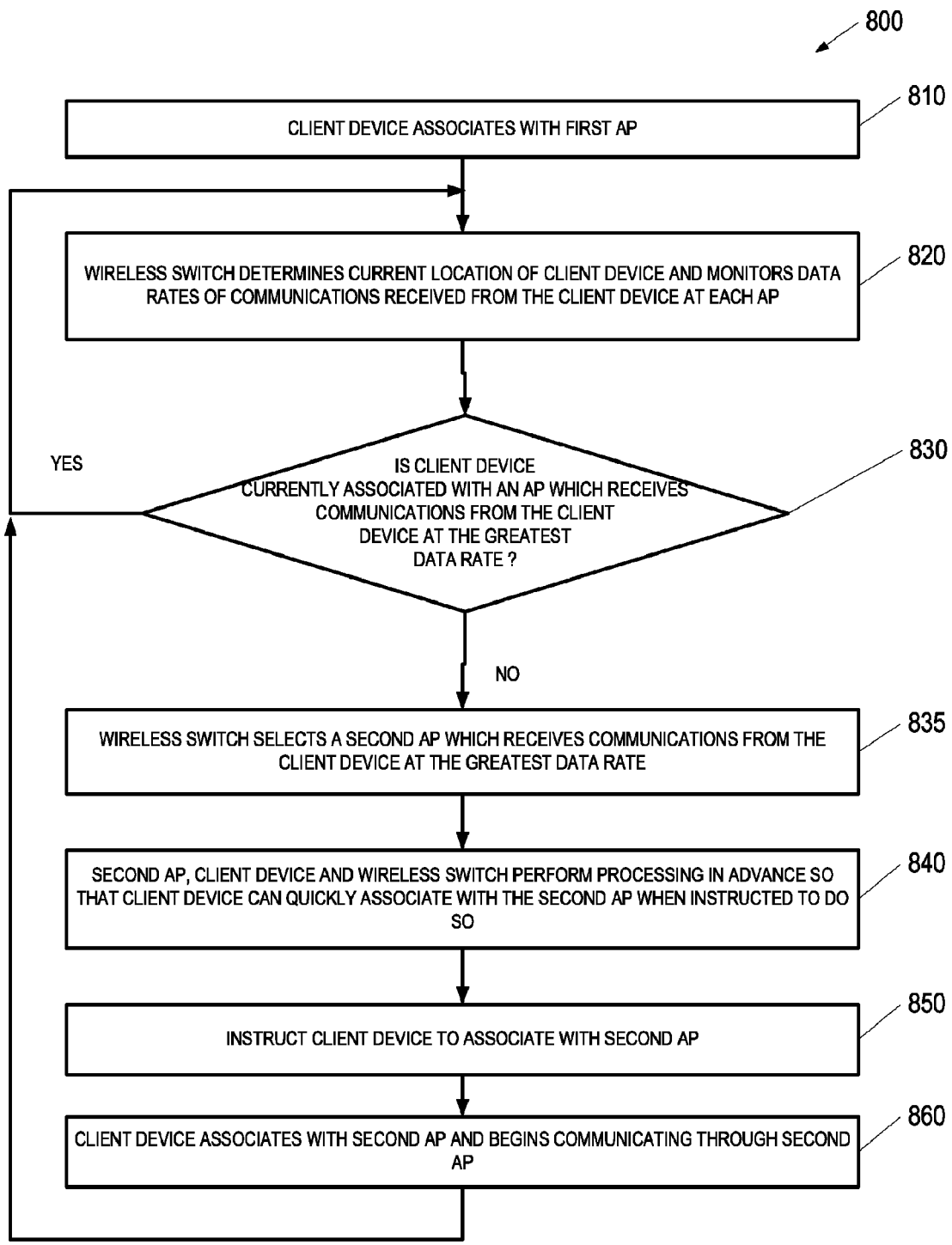
FIG. 8 is a flowchart illustrating a method for associating a computing device with a new access point (AP) in accordance with some embodiments of the present invention.

FIG. 8 is a flowchart illustrating a method 800 for associating a computing device 160 with a new access point (AP) in accordance with some embodiments of the present invention.

At step 810, the wireless computing device 160 associates with initial AP 154A. At step 820, the wireless switch 152 determines the current location of the wireless computing device 160, and monitors incoming data rates received from the wireless computing device 160 at each AP 154. Method 800 then proceeds to step 830 where the wireless switch 152 determines whether the wireless computing device 160 is currently associated with an access point having the "best" incoming data rate with respect to the wireless computing device 160.

If the wireless switch 152 determines that the wireless computing device 160 is currently associated with the access point having the "best" incoming data rate with respect to the wireless computing device 160, then method 800 loops back to step 820, where the wireless switch 152 re-determines the current location of the wireless computing device 160, and continues to monitor incoming data rates received from the wireless computing device 160 at each AP 154.

If the wireless switch 152 determines that the wireless computing device 160 is not currently associated with an access point having the "best" incoming data rate with respect to the wireless computing device 160, then the method 800 proceeds to step 835, where the wireless switch 152 selects, based on the wireless communication performance metrics, the access point having the "best" incoming data rate with respect to the wireless computing device 160 (which in this example is AP 154C).

At step 840, the wireless switch 152, wireless computing device 160 and AP 154C (i.e., the AP which has the "best" incoming data rate with respect to the current location of the wireless computing device 160) perform advance processing so that the wireless computing device 160 can quickly associate with AP 154C. After this processing takes place, then the wireless switch 152 instructs the wireless computing device 160 to associate with AP 154C at step 850. At step 860, the wireless computing device 160 associates with AP 154C and begins communicating through AP 154C.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. In a network comprising a wireless computing device and a wireless switch coupled to a plurality of access points, a method for determining a particular one of access points that the wireless computing device is to be associated with and associating the wireless computing device therewith, the method comprising:

monitoring, at the wireless switch, one or more wireless communication performance metrics regarding wireless communication performance associated with communications between the access point and the wireless computing device;

monitoring, at a wireless switch, a location of a wireless computing device with respect to the access points to determine the relative proximity of the wireless computing device with respect to access points, wherein the wireless switch computes a distance between the wireless computing device and each of the access points based on the wireless communication performance metrics;

determining, at the wireless switch, whether the wireless computing device is currently associated with the closest one of the access points; and transmitting, from the wireless switch, an instruction to the wireless computing device to associate with the closest access point when the wireless computing device is currently associated with an access point other than the closest access point.

2. A method according to claim 1, further comprising:
associating with a first access point at the wireless computing device.

3. A method according to claim 1, further comprising:
selecting, at the wireless switch based on the wireless communication performance metrics, particular access points that wireless computing device can be associated with, wherein the particular access point that is selected has particular wireless communication performance metrics associated therewith which indicate improved channel quality along a wireless link between the wireless computing device and the particular access point, the channel quality performance metric being packet error rate (PER) times signal-to-interference-plus-noise ratio (SINR).

4. A method according to claim 1, further comprising:
performing advanced processing between the wireless switch, wireless computing device and the particular access point, before transmitting the instruction, which allows the wireless computing device to perform expedited association with the particular access point upon receiving the instruction that would normally be performed after the wireless computing device associates with the closest access point, the advanced processing including updating data structures.

5. A method according to claim 4, wherein the advanced processing includes updating security keys and associations.

6. A method according to claim 4, wherein the advanced processing includes verifying access control lists (ACLS)/authentication.

7. A method according to claim 1, further comprising:
associating, at the wireless computing device, with the closest access point; and
communicating, at the wireless computing device, with the closest access point.

8. A network, comprising:
a wireless computing device;
a plurality of access points;
a wireless switch, coupled to the access points, designed to monitor one or more wireless communication performance metrics regarding wireless communication performance associated with communications between the access point and the wireless computing device, monitor a location of a wireless computing device with respect to the access points to determine the relative proximity of the wireless computing device with respect to access points by computing a distance between the wireless computing device and each of the access points based on the wireless communication performance metrics, and to determine, whether the wireless computing device is currently associated with the closest one of the access points, and to transmit an instruction to the wireless computing device to associate with the closest access point when the wireless computing device is currently associated with an access point other than the closest access point.

9. A wireless switch designed to be coupled to a plurality of access points, the wireless switch comprising:

a processor designed to monitor one or more wireless communication performance metrics regarding wireless communication performance associated with communications between the access point and the wireless computing device, monitor a location of a wireless computing device with respect to the access points to determine the relative proximity of the wireless computing device with respect to access points by computing a distance between the wireless computing device and each of the access points based on the wireless communication performance metrics, and to determine, whether the wireless computing device is currently associated with the closest one of the access points; and a transmitter designed to transmit an instruction to the wireless computing device to associate with the closest access point when the wireless computing device is currently associated with an access point other than the closest access point.

* * * * *